United States Patent [19]
Black

[11] Patent Number: 4,727,587
[45] Date of Patent: Feb. 23, 1988

[54] ACOUSTICAL TRANSDUCER MOUNTING ARRANGEMENT

[75] Inventor: William H. Black, Oxnard, Calif.
[73] Assignee: Harris Corp., Melbourne, Fla.

[21] Appl. No.: 888,935
[22] Filed: Jul. 24, 1986
[51] Int. Cl.[4] .......................... H04R 1/02; H02G 3/08; H02G 3/10; H02G 3/22
[52] U.S. Cl. ....................................... 381/188; 174/48; 381/152; 381/205
[58] Field of Search ............... 381/150, 159, 188, 152, 381/205; 174/48

[56] References Cited

U.S. PATENT DOCUMENTS 4,143,249 3/1979 Cinquino ............................. 381/205
4,179,009 12/1979 Birkner ................................ 381/205
4,330,691 5/1982 Gordon ............................... 381/205
4,439,643 3/1984 Schweizer ........................... 381/188
4,484,658 11/1984 Grote ................................. 381/188
4,550,796 11/1985 Tomita ............................... 381/205

*Primary Examiner*—Thomas W. Brown
*Assistant Examiner*—Danita R. Byrd
*Attorney, Agent, or Firm*—Antonelli, Terry & Wands

[57] ABSTRACT

An improved ceiling mountable acoustic transducer mountable in a ceiling tile without the cutting of a hole. A pair of elongated members which pierce the ceiling tile are attached to a housing which holds the acoustic transducer. The housing is held in contact with the surface of the ceiling tile by a pair of spring clips which engage the elongated members. The electrical connection of the transducer to an acoustical electrical signal source is made through the elongated members to the acoustic transducer by attachment of leads to the clips.

20 Claims, 7 Drawing Figures

ACOUSTICAL TRANSDUCER MOUNTING ARRANGEMENT

BACKGROUND OF THE INVENTION

1. Field of the Invention

The invention relates to mounting arrangements for acoustical transducers in ceiling panels and the like.

2. Description of the Prior Art

Acoustical systems have been developed in which a plurality of speakers are connected to a signal source in which the individual speakers are mounted in ceiling panels such as acoustical tiles. These speakers are mounted by the cutting of a circular hole within which the speaker is placed and attached to the circular cutout. This mounting arrangement, while satisfactory, requires the labor of cut out of the circular hole and further the cleanup of the dust and debris which is caused by the cutting of the hole and the resultant damage to the tile.

SUMMARY OF THE INVENTION

The present invention is an improved mounting assembly for acoustical transducers such as loudspeakers in ceiling panels and the like in which the mounting and wiring to the system is accomplished quickly without the requirement of the making of a cutout within the ceiling panel to complete the mounting. With the invention, there is a savings of labor by the elimination of the cutting of the circular hole for the mounting of the acoustical transducer and further the electrical connection of the transducer has been simplified to make the mounting arrangement an integral part of the electrical connection to minimize the number of parts.

A panel mountable acoustic transducer in accordance with the preferred embodiment of the invention includes an acoustic transducer, a housing which holds the acoustic transducer in a fixed position; a mounting assembly attached to the housing having at least one elongated member projecting away from the housing for piercing a panel on which the transducer is to be mounted to fix the position of the housing with respect to the panel; and a removable clip which is attachable to each of the elongated members at selectable fixed longitudinal positions along the member to permit the acoustic transducer to be mounted by attachment of the clip to the elongated member after the elongated member has pierced the panel.

Preferably, the mounting assembly has a pair of elongated members which are respectively electrically coupled to separate terminals of the acoustic transducer. The elongated members complete the electrical circuit between the acoustic transducer and a source of electrical signals for electrically driving the transducer by the connection of a pair of conductors from the source of electrical signals directly to the clips which are in electrical contact with the elongated members which are electrically conductive and electrically coupled to the terminals of the transducer.

The mounting assembly comprises a first clamp attached to the housing for removably attaching one of the elongated members to the housing and second clamp attached to the housing for removably attaching the other of the elongated members to the housing. The clamps include a recess for receiving the elongated member to fix the member with respect to the housing, a conductive section for holding the portion of the elongated member into the recess with the conductive section contacting the elongated member and an electrical conductor coupling the conductive section to one of the terminals of the transducer.

The conductive section is pivotable from a first position where the elongated member is not contacted to a second position where the elongated section contacted and retained in the recess while electrically coupling the elongated member to one of the terminals. The elongated section comprises a first part joined to a second part which forms an angle of intersection of approximately 90° and the second part joined to a third part which forms an angle of approximately 90°. The recess has a first channel which receives the first part and a second channel which receives the second part to retain the elongated member in a fixed position with respect to the housing when the conductive section is pivoted to the second position.

The clip includes a conductive member having at least one aperture for receiving the elongated member. Preferably, the clip has first and second sections joined together to form an angle of intersection and each having an aperture for receiving the elongated member. The sections have a spring characteristic which permits the first and second sections to be elastically moved from the angle of intersection. The apertures do not permit an elongated member to pass through the apertures when the sections form the of intersection angle but permit the member to pass through when the position of the sections is varied by the application of a force to the sections to cause relative movement of the sections. The spring characteristic causes the clip to be retained by the apertures engaging an elongated member when the spring characteristic is the only force applied to the sections.

Each of the clips includes a spring connector for receiving conductors or a screw type connector for connecting the acoustic transducer to the source of the electrical signals. The spring connector contains a deflectable section having a semicircular part for engaging one of the conductors which is coupled to the source of the electrical signals to be applied to the acoustic transducer. The semicircular section presses the electrical conductor against a pair of bifurcations of the clip when the deflectable part is moved from the rest position.

When the invention is used with ceiling tiles having a conductive top surface, an insulative member is placed over each of the elongated members with a sleeve which projects downward to pierce the conductive layer to insulate the elongated projections from the conductive top surface.

The present invention is not limited to the mounting of acoustic transducers to ceiling panels.

A method of mounting an acoustic transducer having a housing which holds the acoustic transducer in a fixed position, a mounting assembly attached to the housing with a pair of elongated members projecting away from the housing which are respectively electrically coupled to different terminals of the transducer within an acoustical system including a pair of conductors for applying a signal from a signal source to the acoustical transducer in accordance with the preferred embodiment of the invention includes the steps of piercing panel on which the acoustical transducer is to be mounted with the pair of elongated members; attaching a separate clip, which is attachable to each of the elongated members at selectable fixed longitudinal positions along the longitudinal member, to each of the elongated members so that the housing contacts a front surface of the panel and the clips contact a back surface of the panel; and attaching the pair of wires respectively to the clips to couple the acoustic transducer to the signal source.

FIGS. *6a* and *6b* are respectively side elevational and top plan views of a second embodiment of a clip used for attaching the elongated members to a panel.

DESCRIPTION OF THE PREFERRED EMBODIMENTS

The present invention provides a panel mountable electrical device which preferably is a loudspeaker mountable within ceiling acoustical tiles. The panel mount obtained with the present invention is characterized by a mount which is made with minimal labor without the necessity of cutting a hole in the panel and permitting electrical connections to be made rapidly through a pair of elongated projections which pierce the panel to fixedly locate the electrical device on the panel. A pair of rapid, quick disconnect clips are mounted on the portion of the projections which extend up through the panel to secure a housing of the electrical device in surface contact with the panel.

Figure 1:
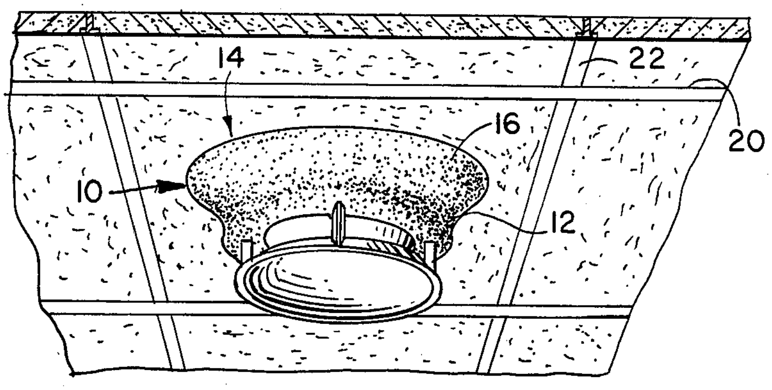
FIG. 1 is a perspective view illustrating the mounting of an acoustic transducer to a ceiling panel in accordance with the invention.
Figure 2:
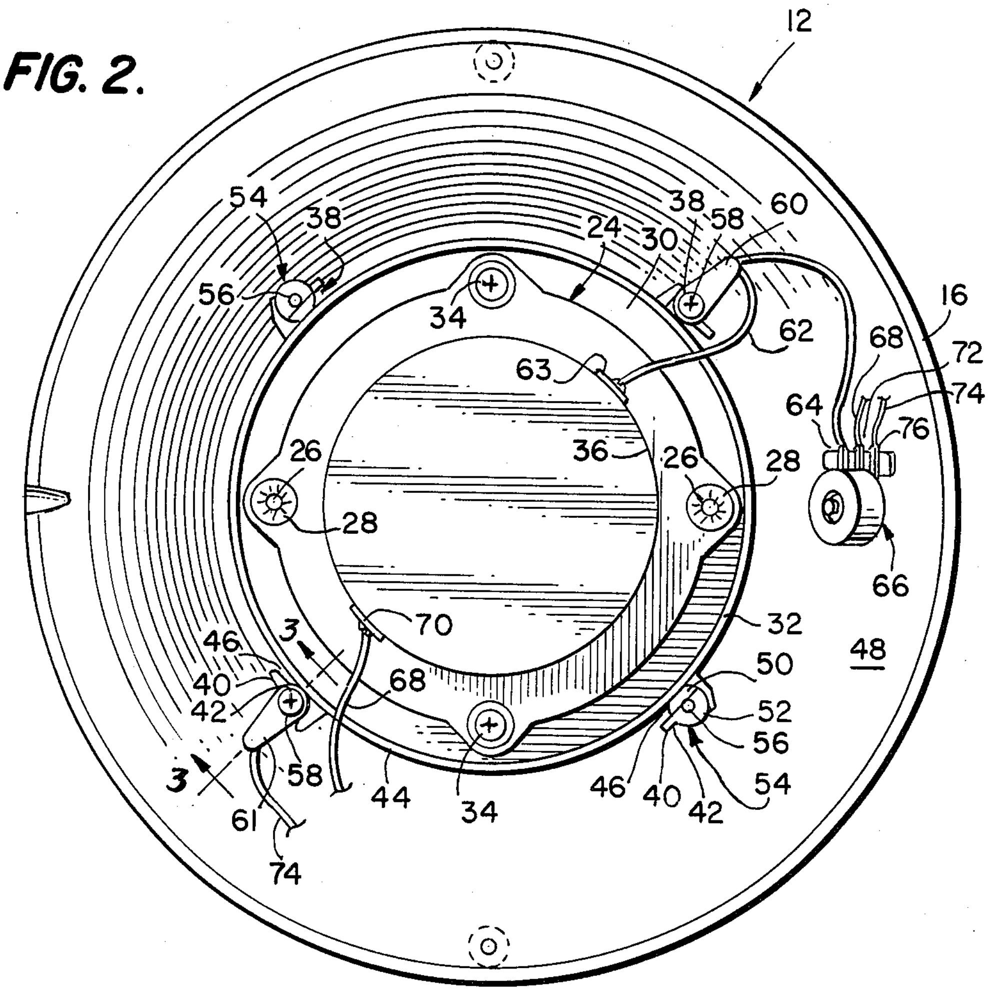
FIG. 2 is a top plan view illustrating the housing and the acoustic transducer in accordance with the invention.

FIG. 1 illustrates a ceiling mountable acoustical device 10 in accordance with the present invention. A housing 12, which contains a loudspeaker unit, which is discussed below with respect to FIG. 2, is attached to an individual ceiling tile 14. The top lip 16 of the housing 12, which is circular, contacts the exposed surface of the ceiling tile 14 to form a flush mount. The individual ceiling tiles 14 are suspended between orthogonally intersecting members 20 and 22 in a conventional manner. Each of the individual ceiling tiles 14 has a portion which extends out over the periphery of the orthogonal members 20 and 22 to provide a lip which is supported by the orthogonal members. Each individual ceiling tile 14 may be pushed upward away from engagement of the orthogonal members 20 and 22 to permit access to the top surface of the ceiling tile. The present invention utilizes the accessibility to the top surface of the ceiling tile to permit the attachment of spring clips, which are discussed below, to a pair of pointed projections which pierce the low density material of the ceiling tile during the mounting operation to secure the lip 16 in surface contact with the exposed surface of the ceiling tile.

FIG. 2 illustrates a top plan view of the preferred embodiment of the invention. The housing 12 is preferably a plastic member which is molded by a conventional process to form a mounting structure having one or more pieces for holding an acoustic transducer 24 which is mounted centrally therein. Four bosses 26 are mounted diametrically about the center of the housing 24 to form the attachment mechanism for the acoustic transducer 24. A pair of spring-type retainers 28 are forced down over a diametrical pair of the bosses 26 to hold the acoustic transducer in surface contact with surface 30 which is the bottom of a cylindrical section formed by the projection of cylindrical wall 32 upward from surface 30. A pair of plastic retainers 34 are connected to the remaining pair of diametrical bosses 26. The pairs of retainers 28 and 34 hold the acoustic transducer firmly into contact with the surface 30 of the housing. A circular aperture 36 is cut in the surface 30 to permit the cone of the transducer 24 to be acoustically coupled to a room within which the acoustic device 10 is mounted. A recess 38 is formed between rectangular section 40, which projects outward from boss 54 having its outer surface 42 located on a circular radius positioned with respect to the center of the housing, and the outer surface 44 of the cylindrical section 30. The recess 38 is comprised of a first section 46 which extends vertically downward to an intersection with the inner surface 48 of the housing 12 located between the top lip 16 of the housing and the outer surface 44 and a second section 50 which extends vertically downward from the top surface 52 of the individual bosses 54. Bosses 54 contain a threaded bore 56. Each of the threaded bores 56 receives a screw 58. A diametrically disposed pair of the threaded bores 56 retains pivotable conductive sections 60 and 61. The pair of the pivotable sections 60 and 61, are rotatably mounted by means of screws 58 to be rotatable from a first position as illustrated to a second position which overlies the recess 38 to form a clamp in combination with recess 38 for elongated members 80 illustrated in FIGS. 3 and 4. An electrical lead 62 is connected to a terminal 63 of the acoustic transducer 24, pivotable section 60 and terminal 64 of a volume control potentiometer 66. A lead 68 connects another terminal 70 of the acoustic transducer 24 to terminal 72 of the volume control 66. A lead 74 connects the pivotable conductive section 61 to terminal 76 of the volume control 66. The volume of the acoustic transducer 24 is varied by rotation of the potentiometer. While the present invention may be used to mount electrical devices other than acoustic transducers, preferably, the housing 12 contains an acoustic transducer having a piezoelectric unit which is manufactured by Motorola Corporation.

Figure 3:
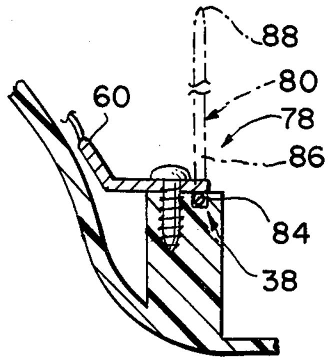
FIG. 3 is an expanded sectional view of the mounting assembly for attaching the elongated members to the housing.

FIG. 3 illustrates a partial sectional view of the housing 12 which illustrates one of the pair of identical mounting assemblies 78 which retain the elongated conductive section 80 which pierces the ceiling tile 14. The elongated member has a first part (illustrated as element 82 in FIG. 4) which is joined to a second part 84 by a 90° angle of intersection. The second part 84 is joined to a third part 86 by a 90° angle of intersection. The third part 86 extends upward from the housing at a 90° angle from the plane defined by the lip 16 of the housing 12. The end 88 of the third part 86 of the elongated member 82 is pointed to facilitate the puncture of the ceiling tile 14 without a high degree of force. As illustrated, the conductive section 60 is rotated to the second position which overlies the second section 84 of the wire to retain it in the recess 38.

Figure 4:
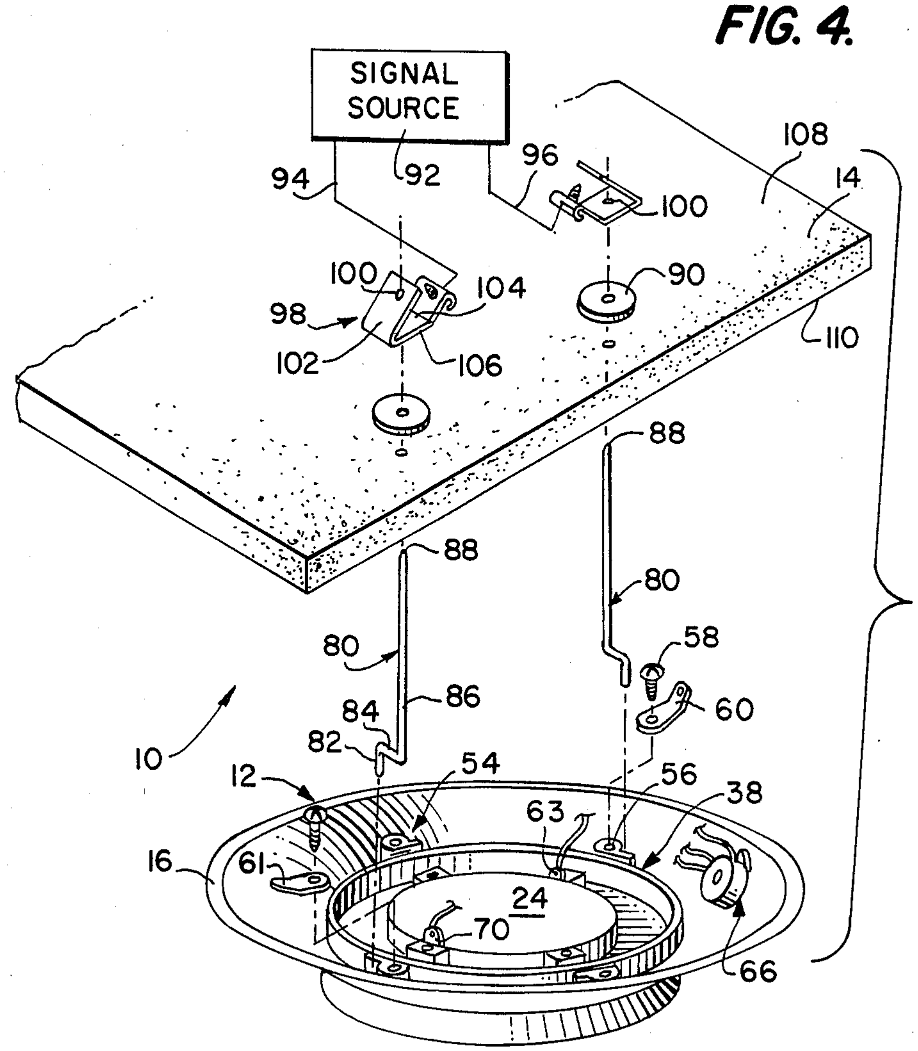
FIG. 4 is an exploded perspective view of the present invention as mounted on a ceiling panel.
Figure 6A:
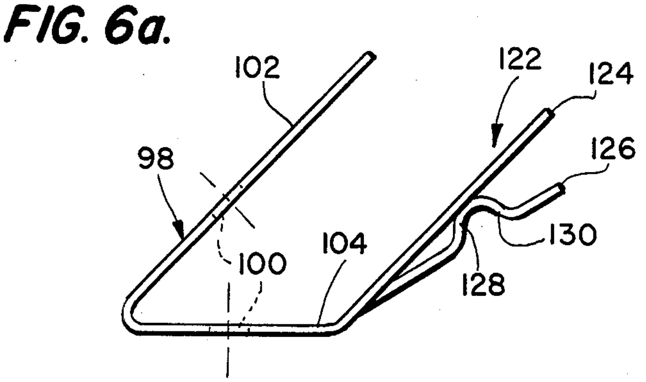
Figure 6B:
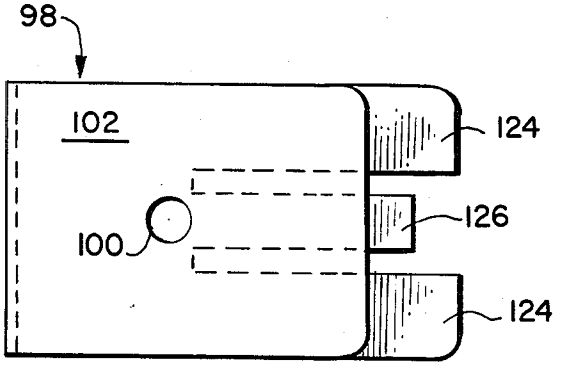

FIG. 4 illustrates an exploded perspective view of an acoustic device 10 in accordance with the present invention as it is mounted in a single ceiling tile 14. The individual elongated members 80 are retained within the recesses 38 by the pivoting of the pivotable sections 60 and 61 to their second positions. The pointed end 88 pierces the ceiling tile 14. An insulative sleeve 90, which is discussed below with reference to FIG. 6, is used in the situation where ceiling tiles 14 having a conductive backing (not illustrated) are used with the present invention. The sleeve 90 pierces the conductive backing to prevent the conductive elongated members 80, which are part of the electrical connections to an acoustical signal source 92, which produces the audio drive signal for the acoustic transducer 24 from being shorted together. Without the insulative sleeve 90 being positioned over each of the elongated members 80, the leads 94 and 96 would be electrically shorted together by the conductive backing. A spring retaining clip 98 is provided having a pair of apertures 100 which receive the elongated member 80. The spring retaining clip 98 has a first section 102 which is joined to a second section 104 by an angle of intersection which is acute. The spring retaining clips 98 have a spring characteristic which holds the apertures 100 at a position with respect to each other at which an elongated member 80 will not freely pass through the apertures. To position the spring retaining clip 98 onto the elongated member 80, a force is applied to the first section 102 and second section 104 to decrease the acute angle therebetween from the angle of intersection to cause the apertures to be aligned to permit free passage of the elongated member 80 therein. The individual spring clips 98 are positioned with the bottom surface 106 of the second section 104 in surface contact with the top surface 108 of the ceiling tile 14. In this position, the lip 16 is in surface contact with the exposed surface 110 of the ceiling tile 14. The individual leads 94 and 96, which couple the signal source 92 to the elongated members 80, are respectively joined to separate spring clips 98.

Figure 5:
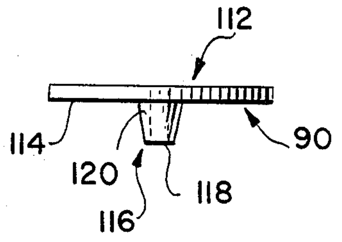
FIG. 5 is a side elevational view of an insulator used to electrically isolate the elongated members from ceiling panels which have a conductive backing layer.

FIG. 5 illustrates a side elevational view of the insulative sleeve 90 of FIG. 4. The insulative sleeve 90 has a cylindrical disc 112 which has a bottom surface 114 which engages the conductive metallic backing of an individual ceiling tile 14. A truncated cone 116 projects away from the bottom surface 114 of the disc 112. The truncated cone 116 has a top surface 118 which pierces the conductive backing of the ceiling tile 14. A cylindrical bore 120 extends through the disc 112 and the truncated cone 116 for receiving the third part 86 of an elongated part 80.

FIGS. *6a* and *6b* illustrate an alternative type of spring retaining clip 98 which may be used with the present invention. The spring retaining clip is identical to that illustrated in FIG. 4 with the exception that a quick disconnect electrical connector 122 is provided for attaching the wires 94 or 96 from the signal source 92. A pair of bifurcations 124 contact a portion of the leads 94 or 96 which have been stripped of insulation when a spring member 126 has been forced to a position in which the semicircular section 128 has been rotated counterclockwise to where the stripped portion of the lead is in contact with the inner surface 130.

The present invention is used in the mounting of an acoustic transducer in ceiling tile 14 in the following manner with reference to FIG. 4. The individual elongated members 80 are fixedly positioned within respective recesses 38 by the rotation of the pivotable sections 60 and 61 to their second position which overlie the second part 84. The threaded members 58 are turned to hold the sections 60 and 61 firmly in contact with the second portion 84 of the members 80. This step establishes an electrical connection between the respective elongated members 80 and the respective terminals 63 and 70 of the acoustic transducer 24. The pointed ends 88 are forced through the ceiling tile 14. The pointed ends 88 are forced upward until the top lip 16 of the housing 12 engages the surface 110 of the ceiling tile 14. If the ceiling tile contains a conductive foil backing, the insulative sleeves 90 are positioned down over the elongated members 80 to force the surface 118 through the conductive foil so that the part 86 does not contact the conductive foil to cause a shorting of the electrical leads 94, 96 together. Thereafter, the spring retaining clips 98 are positioned onto the part 86 by the application of a force to the sections 102 and 104 to force these sections together to align the apertures 100 to permit the third part 86 of the elongated member 80 to extend up through the apertures 100. The individual spring retaining clips 98 are forced downward so that surface 106 engages either the top surface of insulative sleeve 90 or the top surface 108 of the ceiling tile to cause the top lip 16 to engage surface 110. Release of the sections 102 and 104 retains the spring clips 98 in a fixed longitudinal position on the elongated members 80 to fix the acoustical device 10 to the ceiling.

It should be noted that the positioning of the clips on the elongated members performs the dual function of physically attaching the housing in fixed position to the ceiling tile 14 and establishing the electrical connection of the signal source 92 to the individual acoustic transducer 24 by a single step. This is highly beneficial in the installation of multiple acoustic transducers in a large number of rooms or separate locations.

While the invention has been described in terms of its preferred embodiment, it should be understood that numerous modifications may be made thereto without departing from the spirit and scope of the invention as defined in the appended claims. It should be clearly understood that the invention is not limited to the installation of acoustic transducers in ceiling tiles as described above with regard to the preferred embodiment.

I claim:

1. A panel mountable acoustic transducer to be coupled to first and second electrical conductors for permitting electrical current to flow from one of the first and second electrical conductors through the acoustical transducer to the other of the first and second electrical conductors comprising:

(a) an acoustic transducing means having first and second terminals to be coupled respectively to said first and second electrical conductors;

(b) a housing which holds the acoustic transducing means in a fixed position;

(c) a mounting means attached to the housing having first and second elongated members projecting away from the housing for piercing a panel on which the transducing means is to be mounted to fix the position of the housing with respect to a panel, said first elongated member being electrically coupled to said first terminal and said second elongated member being electrically coupled to said second terminal; and (d) first and second removable clips which are attachable to respective first and second elongated members at selectable fixed longitudinal positions along the elongated members to mount the acoustic transducing means on the panel by attachment of the clips to the elongated members after the elongated members have pierced the panel, the first clip establishing an electrical connection between the first electrical conductor and the first elongated member and the second chip establishing an electrical connection between the second electrical conductor and the second elongated member when said acoustic transducing means is attached to a panel and connected to said first and second electrical conductors.

2. A panel mountable acoustic transducer in accordance with claim 1 wherein:

(a) said acoustic transducing means drives a movable sound producing element within the acoustic transducing means to produce sound in accordance with an electrical signal applied thereto; and (b) the first terminal is electrically connected to the first elongated member by a third conductor and the second terminal is electrically connected to the second elongated member by a fourth conductor.

3. A panel mountable acoustic transducer in accordance with claim 2 further comprising:

(a) a source of electrical signals for driving said acoustic transducing means and wherein (b) the first conductor couples the source of electrical signals to the first clip attached to the first elongated member and the second conductor couples the source of electrical signals to the second clip attached to the second elongated member.

4. A panel mountable acoustic transducer in accordance with claim 2 wherein the mounting means comprises:

(a) a first clamping means attached to the housing for removably attaching said first elongated member to the housing; and (b) a second clamping means attached to the housing for removably attaching the second elongated member to the housing.

5. A panel mountable acoustic transducer in accordance with claim 4 wherein each of the clamping means comprises:

(a) a recess for receiving one of the elongated members to fix the member with respect to the housing; and (b) a conductive section for holding the elongated member in the recess, the conductive section contacting the respective elongated member and the respective third or fourth conductor.

6. A panel mountable acoustic transducer in accordance with claim 5 wherein:

each conductive section is pivotable from a first position where the elongated member is not contacted by the conductive section to a second position where the elongated member is contacted and retained in the recess.

7. A panel mountable acoustic transducer in accordance with claim 6 wherein:

(a) the elongated section comprises a first part joined to a second part which forms an angle of intersection of approximately 90°; and (b) the recess has a first channel which receives the first part and a second channel which receives the second part to retain the elongated member in a fixed position with respect to the housing when the conductive section is pivoted to the second position.

8. A panel mountable acoustic transducer in accordance with claim 1 wherein:

the first and second clips each comprise a conductive member having at least one aperture for receiving the respective elongated member.

9. A panel mountable acoustic transducer in accordance with claim 8 wherein each clip further comprises:

first and second sections joined together to form an angle of intersection, and the apertures receiving one of the elongated members, the first and second sections having a spring characteristic permitting the first and second sections to be elastically moved from the angle of intersection wherein the apertures do not permit an elongated member to pass therethrough when the first and second sections form the angle of intersection, but permit the elongated member to pass therethrough when the position of the first and second section is varied by the application of a force to cause relative movement of the sections, the spring characteristic causing each clip to be retained at a fixed position on the elongated member by the apertures engaging the elongated members.

10. A panel mountable acoustic transducer in accordance with claim 3 wherein:

each of the first and second clips further comprises a spring connector for receiving the respective first or second conductor to establish electrical contact therewith.

11. A panel mountable acoustic transducer in accordance with claim 10 wherein each spring connector comprises:

a deflectable section having a semicylindrical part for engaging the respective first or second conductors when the semicylindrical part biases the respective first or second conductors against a pair of bifurcations of one of the clips when the deflectable part is moved from a first position.

12. A panel mountable acoustic transducer in accordance with claim 2 further comprising:

an insulative member engaging each of the elongated members with a sleeve projecting downward toward the housing from a surface of the insulative member which engages a surface of the panel located farthest from the housing.

13. A panel mountable electrical device to be coupled to first and second electrical conductors for permitting electrical current to flow from one of the first and second electrical conductors through the electrical device to the other of the first or second electrical conductors comprising:

(a) an electrically powered means having first and second terminals to be coupled respectively to said first and second electrical conductors;

(b) a housing which holds said electrically powered means in a fixed position;

(c) a mounting means attached to the housing having at least first and second elongated members projecting away from the housing for piercing a panel on which the electrical device is to the mounted to fix the position of the housing with respect to a panel, said first elongated member being electrically coupled to said first terminal and said second elongated member being electrically coupled to said second terminal; and (d) first and second separate removble clips which are respectively attachable to the first and second elongated members at selectable fixed longitudinal positions along the longitudinal members to mount the electrical device on the panel by attachment of the clips to the elongated members after the elongated members have pierced the panel, the first clip establishing an electrical connection between the first electrical conductor and the first elongated member and the second clip establishing an electrical connection between the second electrical conductor and the second elongated member when said electrically powered means is attached to a panel and connected to said electrical conductors.

14. A panel mountable acoustic transducer comprising:

(a) acoustic transducing means;

(b) housing means for holding said acoustic transducing means;

(c) piercing means attached to said housing means for piercing a panel and having at least one rigid elongated member projecting from said housing means for piercing a panel to which the transducer is to be mounted, said piercing mean being electrically conducting, electrically coupled to said acoustic transducing means and forming part of a conductive path between said acoustic transducing means and an external signal conducting means through which current flows during operation of said acoustic means; and (d) fastening means for attaching said elongated member to the panel after the elongated member has pierced the panel.

15. The panel mountable acoustic transducer in accordance with claim 14 wherin:

said fastening means includes electrical connector means for electrically coupling said elongated member to an external circuit including said external signal conducting means.

16. A panel mountable acoustic transducer in accordance with claim 14 wherein:

said fastening means comprises means for grasping said elongated member at a selected longitudinal position thereon.

17. A panel mountable acoustic transducer in accordance with claim 14 wherein:

said means for grasping engages the panel on the side opposite said housing means to hold said housing means securely in place.

18. A panel mountable acoustic transducer in accordance with claim 15 wherein:

said fastening means included electrical insulator means for insulating said elongated member from a conductive surface on the panel.

19. A panel mountable acoustic transducer in accordance with claim 18 wherein said fastening means comprises:

means for grasping said elongated member at a selected longitudinal position thereon.

20. A panel mountable acoustic transducer in accordance with claim 19 wherein:

said means for grasping engages said insulator means and said electrical insulator means engages the panel on a side opposite said housing means to hold said housing means in place.

* * * * *

UNITED STATES PATENT AND TRADEMARK OFFICE
CERTIFICATE OF CORRECTION

PATENT NO : 4,727,587

DATED : February 23, 1988

INVENTOR(S) : William H. Black

It is certified that error appears in the above-identified patent and that said Letters Patent is hereby corrected as shown below:

In the claims at column 10, line 9, delete "14" and insert --16--.

Signed and Sealed this

Seventeenth Day of October, 2000

Attest:

Q. TODD DICKINSON

Attesting Officer

*Director of Patents and Trademarks*